Figure 1:
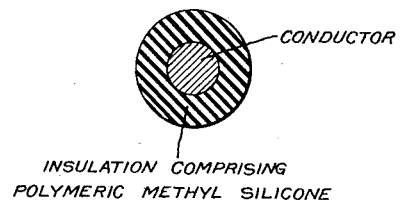

Oct. 7, 1941.   E. G. ROCHOW   2,258,218
METHYL SILICONES AND RELATED PRODUCTS
Filed Aug. 1, 1939

CONDUCTOR

INSULATION COMPRISING
POLYMERIC METHYL SILICONE

CONDUCTOR

INSULATION COMPRISING FIBROUS
MATERIAL COATED AND IMPREGNATED
WITH POLYMERIC METHYL SILICONE

Inventor:
Eugene G. Rochow,
by Harry E. Dunham
His Attorney.

Patented Oct. 7, 1941

2,258,218

UNITED STATES PATENT OFFICE 2,258,218

METHYL SILICONES AND RELATED PRODUCTS

Eugene G. Rochow, Schenectady, N. Y., assignor to General Electric Company, a corporation of New York Application August 1, 1939, Serial No. 287,787

20 Claims. (Cl. 174—121)

This invention relates to new compositions of matter, their preparation and use. More particularly it is concerned with new and useful polymeric bodies comprising chemical compounds of silicon, oxygen and at least one methyl group attached directly to silicon. These polymeric bodies may be defined more specifically as polymers of methyl silicone and of related compounds in which the methyl groups are replaced in part by oxygen.

I have discovered that the heretofore unknown methyl silicone can be obtained in the form of stable polymeric bodies having characteristic properties which make them of particular value in industry. Polymeric di-methyl silicone has a unit structure,

which in the high molecular aggregate may have chain endings such as hereinafter described. Related compositions in which the methyl groups are replaced in part by oxygen would give rise to the unit structure

which, in its polymeric forms, or in combination with the first-named unit structure gives rise to a series of polymeric substances of varying properties.

The polymeric bodies of this invention are unique in that they have no carbon-to-carbon bonds and therefore are free from the type of thermal decomposition which initiates in the rupture of a carbon-to-carbon bond. In marked contrast previously known silicones, specifically ethyl silicone (Kipping and Martin, Journal of the Chemical Society, 95, 302), propyl silicone (Kipping and Meads, J. C. S., 107, 459), phenyl silicone (Kipping and Martin, J. C. S., 101, 2108, 2121, 2125), benzyl silicone (Kipping and Robinson, J. C. S., 101, 2142, 2156) and tolyl silicone (Kipping and Pink, J. C. S., 123, 2830), all have carbon-to-carbon linkages within their structure.

I may use any suitable method for preparing these new compounds of silicon, oxygen and the methyl group. For example, I may hydrolyze a methyl silicon halide, for instance methyl silicon chloride, bromide or iodide, and dehydrate the resulting hydroxy product. I prefer to use methyl silicon chlorides as starting materials for preparing the hydroxy compounds.

In order that those skilled in the art better may understand how the present invention may be carried into effect, the following illustrative examples are given:

Example 1

(A) An ether solution of 1.75 mols of methyl magnesium bromide is added slowly and with rapid stirring to an ether solution containing 1 mol of silicon tetrachloride, the latter solution being cooled to minus 20° C. or lower prior to the addition of the former. The solution of methyl magnesium bromide is added at such rate, and the reaction mixture so cooled, that the temperature of the mixture does not rise above about 0° C. Preferably the reaction mixture is maintained at minus 20° C. or lower.

Since the amount of methyl magnesium bromide employed is insufficient to convert all the silicon tetrachloride to the dimethyl derivative, there is formed a mixture of mono- and di-methyl silicon chlorides, thus:

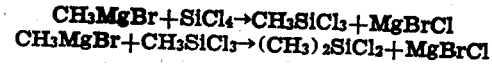

Probably a smaller amount of trimethyl silicon chloride also is formed:

$CH_3MgBr + (CH_3)_2SiCl_2 \rightarrow (CH_3)_3SiCl + MgBrCl$

The magnesium salts separate as a granular mass, leaving the silicon derivatives in ether solution.

(B) The magnesium salts may be separated, if desired, but it is not necessary to do so. Ordinarily, the entire cold reaction mixture is poured into a suitable receptacle containing cracked ice, thereby hydrolyzing the silicon derivatives thus:

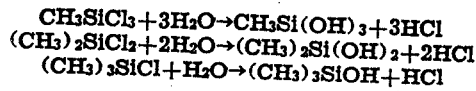

These hydroxy compounds readily condense with loss of water to form initial and intermediate condensation products. These products are ether-soluble and are collected by separating the ether layer. After washing free of acid, the ether solution is concentrated to obtain a viscous liquid suitable for adhesive and surface-coating applications. This viscous liquid may be further condensed and polymerized by suitably heating, for example at 100° to 200° C., to form bodies of desired flexibility and hardness. In many cases it is advantageous to advance the condensation and polymerization of the liquid substance by heating it in situ, that is, in the position of its ultimate use.

When the liquid reaction product obtained as above described is heated gradually to 200° C. over a period of 24 hours and then kept at 200° C. for 48 hours, the resulting product is a clear, colorless, odorless, horny solid. A typical polymer produced in this way has a density of 1.19 grams per cubic centimeter and a refractive index of 1.423. An analysis of this polymer showed it to contain 23.05% carbon, 6.02% hydrogen, 38.10% silicon and 32.83% oxygen, from which the average number of methyl groups per silicon atom may be calculated as 1.41. It has a dielectric constant of 3.7 at 26° and 3.6 at 56° C. Its power factor at 60 cycles is 0.008 at 26° C. and 0.0045 at 56° C. It is insoluble in water, alcohol, glycol, carbon tetrachloride and bromonaphthalene. It is difficult to ignite and burns slowly, leaving a white siliceous ash. It may be heated to 200° C. in air for several days without discoloration, melting, or any discernible change except some embrittlement. At 300° C. in air it oxidizes and disintegrates in 24 hours, but if heated in vacuo it may be taken to 550° C. for 20 hours without disintegration or any other change except yellowing. During such heating in vacuo water vapor is released above 200° C., showing that condensation continues to take place.

The polymeric methyl silicone produced as described above differs from the silicones previously described in the chemical literature not only in composition, but also in character of the solid body obtained. It is thermosetting to a degree unknown in other silicons. It becomes infusible when heated, for example as above set forth, and retains its shape even at 550° C. in vacuo. The solid polymer is clear, colorless and non-sticky, as opposed to the brown, glue-like phenyl silicone polymers which typify the earlier known silicones.

While the structure of this horny polymer is not completely understood, I believe it to be essentially a network of silicon-oxygen chains in which the methyl groups are linked to the silicon atoms. Thus when dimethyl silicol condenses the reaction probably proceeds thus:

$2(CH_3)_2Si(OH)_2 \rightarrow HO—Si(CH_3)_2—O—Si(CH_3)_2OH + H_2O;$ $3(CH_3)_2Si(OH)_2 \rightarrow HO—Si(CH_3)_2—O—Si(CH_3)_2—O—Si(CH_3)_2OH + 2H_2O;$ etc.

Such chains of alternate Si and O atoms may be terminated, for example, by an OH group, which may react further, or by an —Si(CH₃)₃ group, which is unable to react further:

$—O—Si(CH_3)_2OH + (CH_3)_3SiOH \rightarrow$
$—O—Si(CH_3)_2—O—Si(CH_3)_3 + H_2O$ Wherever the —Si(OH)₃ grouping enters the chain, the possibility of cross links becomes evident:

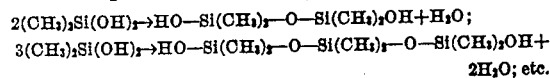

This permits a network structure through further condensation:

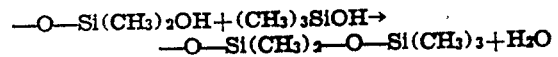

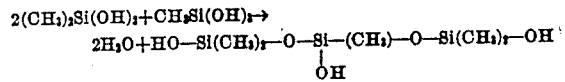

However, the —Si(OH)₃ group conceivably also may terminate a chain:

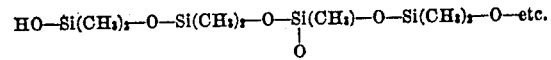

Methyl siliconic acid similarly would end a chain.

As shown above the network of silicon-oxygen chains may be terminated by a variety of groups and may be branched and cross-linked by oxygen bridges. The mechanical properties of the solid polymer are believed to depend in large part upon the extent of this cross-linking and the length of the linear chains. These factors conveniently may be varied by changing the proportions of reacting substances as described in the following examples.

*Example 2*

(A) Molar proportions of SiCl₄ and CH₃MgBr are allowed to react in cold ether solution as described under Example 1. In this case the principal derivative is mono-methyl silicon trichloride, although smaller amounts of the di- and tri-methyl derivatives also are obtained by the reactions given under A of Example 1.

(B) The cold ethereal solution is poured upon cracked ice to hydrolyze the methyl silicon chlorides as described under B of Example 1. The ether-soluble products are separated from the water and washed free of acid. This ether solution of hydroxy compounds and their initial and intermediate condensation products may be used in this form for application as an adhesive, or it may be concentrated by evaporation of the ether at room temperature.

(C) Further condensation is allowed to take place, when desired, at temperatures between 20° and 100° C. At 20° C. the evaporation of the solvent deposits a sticky mass. This mass hardens over a period of several days into a hard, brittle solid. At temperatures approaching 100° C. the condensation reaction takes place rapidly, yielding a hard, brittle, glassy solid within an hour. This substance is infusible and is insoluble in water and the common organic solvents. An analysis of a typical polymer produced in this way showed 18.55% carbon, 4.58% hydrogen, 40.10% silicon and 36.77% oxygen, from which the average number of methyl groups per silicon atom may be calculated as 1.08.

According to the theory of probable structure which I have outlined above, this solid polymer may be composed of a highly cross-linked network of silicon and oxygen atoms with an average of approximately one methyl group per silicon atom:

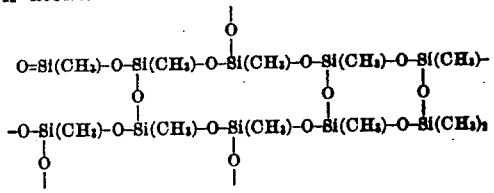

*Example 3*

(A) Two to 2¼ mols of CH₃MgBr are added slowly to a cold ethereal solution of 1 mol of SiCl₄ as described under the above examples. The principal product is dimethyl silicon dichloride, although the mono- and tri-methyl derivatives undoubtedly are formed in smaller amounts.

(B) The reaction mixture is hydrolyzed as in the preceding examples. The hydroxy compounds and their initial and intermediate condensation products are collected in an ether layer, washed free of acid, and separated from ether by distilling off the latter at 36° C. Removal of the ether leaves an oily liquid which loses water on further heating but does not become solid.

(C) The oily liquid of B when heated at an elevated temperature for a prolonged period, for example at 120° C. for 4 hours in air, sets to a soft, somewhat rubbery gel. This gel is insoluble in common organic solvents, is infusible, and may be heated to 260° C. without apparent change.

Compositions produced as described under the above examples are essentially variations of the normal dimethyl silicons and its polymers, the points of variation intentionally being brought about in order to vary the properties of the product and to render it useful for particular service applications. The term "methyl silicone" as used generally herein and in the appended claims therefore is intended to include within its meaning chemical compounds, specifically condensation products and polymers of varying molecular weight, composed essentially of silicon, oxygen and at least one methyl group attached directly to silicon. The methyl group or groups may be attached to any or all (preferably to all) of the silicon atoms contained in the molecule. Ordinarily, the polymer will have in its molecule an average of approximately one to approximately two methyl groups for each silicon atom. A product having a wide variety of applications because of its particular combination of properties is a polymer containing an average of approximately 1.3 to approximately 1.7 methyl groups per silicon atom.

The methyl silicones of this invention ordinarily are resinous in character. In their final form as polymeric bodies they have the advantage of thermal stability greater than that of the ordinary organic coating and bonding agents and do not decompose into a conducting carbonaceous residue. As they are free from many of the limitations of the purely organic substances, these new products may be used to advantage with inorganic fillers and fibers such as asbestos, mica, glass fiber, and the like, to produce a composite insulation capable of withstanding higher temperatures than would be possible with the use of organic binders. This in turn permits the design of electrical machinery for operation at higher temperatures.

Figure 2:
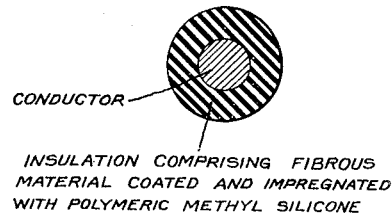

As illustrative examples of how methyl silicones may be used in the field of insulation, the following are cited:

A liquid coating composition comprising partly polymerized methyl silicone and a volatile solvent may be applied to a metallic conductor such as copper wire, which thereafter is heated to vaporize the solvent and to continue or complete the polymerization of the silicone in situ. In some cases it may be desirable to wrap the conductor with a fibrous material such as asbestos, glass fibers, cotton or paper before treating with the solution. A further procedure is to coat and at least partly impregnate the wrapped conductor with methyl silicone, wind the thus insulated conductor into the desired coil, and then heat the wound coil to complete the polymerization of the silicone. In the accompanying drawing Fig. 1 represents a cross-sectional view of a metallic conductor provided with insulation comprising polymeric methyl silicone; and Fig. 2 shows a similar view of a metallic conductor provided with insulation comprising fibrous material coated and impregnated with polymeric methyl silicone.

Sheet insulation may be prepared by treating woven or felted organic or inorganic fabrics or paper with methyl silicone. Sheet insulation also may be prepared by binding flaky inorganic substances with polymeric methyl silicone. Certain of these silicones effectively wet and bond mica and advantageously may be used in the production of laminated mica products comprising mica flakes cemented and bonded together with the silicone. Polymeric methyl silicone having in its molecule an average of approximately 1 to approximately 1.5 methyl groups per silicon atom is especially suitable for this purpose. Mica products made with a methyl silicone binder have a high dielectric strength and outstanding heat resistance. They are able to withstand temperatures of the order of 250° to 300° C. without intumescence or separation of the binder from the mica flakes.

Self-supporting coherent films or sheets of clay such as bentonite may be treated with a composition comprising polymeric methyl silicone to advantage. In the production of such sheet materials from bentonite, particles of bentonite of ultramicroscopic size are employed, for example particles having a maximum diameter of 3000 Å. Angstrom), more specifically from about 500 Å. to about 2000 Å. Fibers such as glass may be embedded in, or otherwise associated with, these clayey paper-like sheet materials (as more particularly disclosed and claimed in the copending applications of Theodore R. Walters, Serial No. 263,193, filed March 21, 1939, and Serial No. 370,807, filed December 19, 1940, both of which applications are assigned to the same assignee as the present invention), and the composite material treated, specifically coated, with methyl silicone. These silicone-treated bentonite and bentonite-glass fiber sheet materials are especially adapted for high temperature electrically insulating applications.

In addition to their use in the field of insulation, the methyl silicones of varying form may be used as protective coatings, for instance as coatings for glass bulbs and other articles of manufacture which are, or may be, exposed to abnormal heat conditions or to hot flying particles. With or without the addition of pigments such as graphite, they may be used in coating metallic surfaces, for example metal vacuum tubes. The high heat resistance of these silicones makes them especially suitable for such applications.

The silicones of this invention may be used as components of so-called resistance or semi-conducting paints. Such paints contain controlled amounts of conducting materials such as carbon, silicon carbide, powdered metal, conducting oxides, etc., in order to impart to the dried paint a particular degree of resistance or semi-conduction.

The methyl silicones also may be used as sealing compositions, for instance in making vacuum-tight joints between glass and metal. By applying a solution of the silicone around a glass-to-metal joint which is imperfectly sealed, and thereafter baking to remove the solvent and to form a solid polymer, leaks in such joints may be effectively sealed.

In certain cases it may be desirable to copolymerize mixtures of compounds having a particular ratio of methyl groups to silicon in the molecule of each individual compound. This may be accomplished by mixing suitable proportions of, for example, mono- and di-methyl silicon chlorides, hydrolyzing the mixture and dehydrating the resulting product. In other cases the separately hydrolyzed products may be mixed and thereafter dehydrated. However, in such cases the components should be mixed before condensation and polymerization have advanced to the point where the bodies become incompatible. For other applications it may be desirable to polymerize the individual silicones to solid form and then mix and grind the materials together to obtain a composite mass. In these ways compositions having properties best adapted for a particular application may be obtained.

The individual, co-polymerized, or mixed solid polymers may suitably be incorporated into other materials to modify the properties of the latter. For example, they may be compounded with substances such as natural and synthetic rubber; tars, asphalts and pitches, more specific examples of which are wood tars, petroleum asphalts and vegetable pitches; natural resins such as wood rosin, copal, shellac, etc.; synthetic resins such as phenolaldehyde resins, urea-aldehyde resins, alkyd resins, cumar resins, vinyl resins, esters of acrylic and methacrylic acid, etc.; cellulosic materials such as paper, inorganic and organic esters of cellulose such as cellulose nitrate (pyroxylin), cellulose acetate including the triacetate, cellulose propionate, cellulose butyrate, etc., cellulose ethers such as methyl cellulose, ethyl cellulose, benzyl cellulose, etc. In certain cases the hard, brittle polymers may be pulverized and used as fillers for substances such as above mentioned. In other cases, especially when the silicone is compatible with the substance with which it is incorporated, it may be in the form of a liquid or relatively soft polymer of low molecular weight prior to compounding with the substance to be modified.

The low molecular weight polymers herein described also may be dissolved or dispersed in oils, such as linseed oil, Chinawood oil, perilla oil, soya bean oil, etc., alone or mixed with solvents, pigments, plasticizers, driers and other components of coating compositions to yield products which, when applied to a base member and air-dried or baked, have a high degree of heat resistance.

Laminated products may be made by superimposing organic or inorganic fibrous sheet materials coated and impregnated with methyl silicone, and thereafter bonding the sheets together under heat and pressure. Molding compositions and molded articles may be formed from the silicones of this invention. If desired, filling materials such as asbestos, glass fibers, talc, quartz powder, wood flour, etc., may be incorporated into such compositions prior to molding. Shaped articles are formed from such compositions under heat or under heat and pressure in accordance with practices now widely used in the plastics art.

In my copending application Serial No. 332,099, filed April 27, 1940, which application is a continuation-in-part of the present application, I have claimed methyl aryl silicones and insulated conductors and other products utilizing the same.

What I claim as new and desire to secure by Letters Patent of the United States is:

1. An electrically insulating material of high resistance to heat and thermal decomposition, said material comprising essentially a polymeric methyl silicone.

2. An electrically insulating material comprising essentially a polymer having the unit structure

3. A product comprising polymeric methyl silicone having in its molecule an average of from approximately one to approximately two methyl groups for each silicon atom.

4. Polymeric methyl silicone having in its molecule an average of from approximately 1.3 to 1.7 methyl groups per silicon atom.

5. A composition of matter comprising a mixture of polymers of methyl silicone.

6. A liquid coating composition comprising a volatile solvent and partly polymerized, soluble methyl silicone having in its molecule an average of from approximately one to approximately two methyl groups for each silicon atom.

7. An article of manufacture having a surface covered with an adhering composition comprising essentially an insoluble polymeric methyl silicone wherein the average number of methyl groups per silicon atom is less than two.

8. An article of manufacture comprising an inorganic sheet material treated with a composition comprising a polymeric methyl silicone.

9. An article of manufacture comprising a sheet material formed of cohering particles of bentonite, said sheet material being treated with a composition comprising polymeric methyl silicone.

10. An article of manufacture comprising a mass formed of glass fibers, said mass being coated and at least partly impregnated with a composition comprising polymeric methyl silicone.

11. An article of manufacture comprising asbestos coated and at least partly impregnated with a composition comprising polymeric methyl silicone.

12. An insulated electrical conductor comprising a metallic conductor and insulation thereon comprising a polymeric methyl silicone.

13. An insulated electrical conductor comprising a metallic conductor and insulation thereon comprising polymeric methyl silicone having in its molecule an average of from approximately one to approximately two methyl groups for each silicon atom.

14. An insulated electrical conductor comprising a metallic conductor and insulation thereon comprising a mass of glass fibers coated and at least partly impregnated with polymeric methyl silicone.

15. The method of preparing new synthetic compositions which comprises hydrolyzing a mixture of methyl silicon halides, said halides containing an average of not exceeding substantially two methyl groups for each silicon atom, and dehydrating the hydrolyzed product.

16. An article having a surface provided with an adhering coating comprising a methyl silicone converted after application to said surface from a soluble, partly polymerized state to an insoluble, substantially completely polymerized state.

17. A product comprising an insoluble, infusible, polymerized methyl silicone wherein the average number of methyl groups per silicon atom is less than two.

18. A composition comprising a polymerized methyl silicone wherein the average number of methyl groups per silicon atom is not more than 1.7.

19. A composition comprising a mixture containing an organic plastic composition and a polymerized methyl silicone wherein the average number of methyl groups per silicon does not exceed substantially two.

20. A liquid coating composition comprising a volatile solvent and a soluble, partly polymerized methyl silicone wherein the average number of methyl groups per silicon atom is less than two.

EUGENE G. ROCHOW.